(12) United States Patent
Kim et al.

(10) Patent No.: US 7,308,199 B2
(45) Date of Patent: Dec. 11, 2007

(54) OPTICAL CDMA TRANSMITTING APPARATUS AND METHOD FOR TRANSMITTING BIPOLAR DATA

(75) Inventors: Bong Kyu Kim, Daejon (KR);
Younghee Yeon, Gangwon-Do (KR);
Byoung Whi Kim, Gyeonggi-Do (KR);
Hyeong Ho Lee, Daejon (KR); Sangjo Park, Chungcheongbuk-Do (KR)

(73) Assignee: Electronics and Telecommunications Research Institute (KR)

( * ) Notice: Subject to any disclaimer, the term of this patent is extended or adjusted under 35 U.S.C. 154(b) by 700 days.

(21) Appl. No.: 10/645,289

(22) Filed: Aug. 18, 2003

(65) Prior Publication Data

US 2004/0081463 A1 Apr. 29, 2004

(30) Foreign Application Priority Data

Oct. 29, 2002 (KR) ...................... 10-2002-0066270

(51) Int. Cl.
*H04J 4/00* (2006.01)
*H04J 14/00* (2006.01)
*H04B 10/04* (2006.01)
*H04B 10/12* (2006.01)

(52) U.S. Cl. ........................... 398/78; 398/77; 398/190

(58) Field of Classification Search ........ 398/183–190, 398/77, 78

See application file for complete search history.

(56) References Cited

U.S. PATENT DOCUMENTS 4,460,992 A 7/1984 Gutleber
5,760,941 A 6/1998 Young et al.
6,236,483 B1* 5/2001 Dutt et al. ................... 398/141
2004/0018018 A1* 1/2004 Izadpanah ..................... 398/77
2004/0208233 A1* 10/2004 Dafesh ......................... 375/147

FOREIGN PATENT DOCUMENTS

KR 2001-0072119 7/2001

OTHER PUBLICATIONS

"Experimental demonstration of bipolar optical CDMA system using a balanced transmitter and complementary spectral encoding"; Lam et al.; Photonics Technology Letters, IEEE; vol. 10, Issue 10, Oct. 1998, pp. 1504-1506.*

(Continued)

*Primary Examiner*—Jason Chan
*Assistant Examiner*—Nathan M. Curs
(74) *Attorney, Agent, or Firm*—Blakely, Sokoloff, Taylor & Zafman (57) ABSTRACT

Provided is an optical Code Division Multiple Access (CDMA) transmitting apparatus and method for transmitting bipolar data in an optical CDMA system. The optical CDMA transmitting apparatus and method of the present research has a simple structure, including only one optical CDMA encoder and one optical modulator. This technology minimizes multiple access interference by using modified pseudo-noise code in the encoding process, thus improving the optical CDMA transmission performance. The optical CDMA transmitting apparatus includes: an optical CDMA encoding means for encoding lights from the outside into a code or a complement code of the code; and an optical modulation means for transmitting the code or the complement code of the code which is selected in the optical CDMA encoding means based on the polarity (either '0' or '1') of the data inputted from the outside.

16 Claims, 5 Drawing Sheets

OTHER PUBLICATIONS

"Introduction to DWDM Technology"; Kartalopoulos; IEEE Press, 2000, pp. 142-144.*

"New Architecture For Incoherent OPtical CDMA To Achieve Bipolar Capacity", Electronics Letters, Feb. 3, 1994, pp. 258-259.

"New Architecture for FBG based Optical CDMA Systems using pseudo PN code with bipolar capacity", Photonics Conference 2002, Oct. 30-Nov. 1, 2002, pp. 545-546.

* cited by examiner

FIG. 1

| USER No. | CODE |
|---|---|
| 1 | 1 1 1 0 0 1 0 \| 0 |
| 2 | 0 1 1 1 0 0 1 \| 0 |
| 3 | 1 0 1 1 1 0 0 \| 0 |
| 4 | 0 1 0 1 1 1 0 \| 0 |
| 5 | 0 0 1 0 1 1 1 \| 0 |
| 6 | 1 0 0 1 0 1 1 \| 0 |
| 7 | 1 1 0 0 1 0 1 \| 0 |

←—— PN CODE ——→ STUFFED BIT

OPTICAL CDMA TRANSMITTING APPARATUS AND METHOD FOR TRANSMITTING BIPOLAR DATA

FIELD OF THE INVENTION

The present invention relates to an optical Code Division Multiple Access (CDMA) system; and, more particularly, to an optical CDMA transmitting apparatus and method for transmitting bipolar data in an optical CDMA system.

DESCRIPTION OF RELATED ART

Conventionally, the use of modified pseudo-noise (PN) codes have been limited to a temporal domain Code Division Multiple Access (CDMA) system, which uses electric signals in consideration of their electrical characteristics, and not used in a spectral domain.

In conventional optical CDMA systems, an encoder uses two optical modulators and one electric switch to transmit bipolar data. If the data is '1', the CDMA transmitting apparatus transmits PN codes or Walsh codes, or if the data is '0', it transmits a complement code to the codes used when the data are '1'. Here, the modified PN code is not applied thereto. Moreover, the structure of the encoder for transmitting bipolar codes is complicated, and the use of an electric switch has dropped the data transmission rate.

SUMMARY OF THE INVENTION

It is, therefore, an object of the present invention to provide an optical Code Division Multiple Access (CDMA) transmitting apparatus and method which has one simple structured optical CDMA encoder and one optical modulator.

It is another object of the present invention to provide an optical CDMA transmitting apparatus and method having a simple-structured optical CDMA encoder and an optical modulator, the apparatus and method which can improve the optical CDMA transmission characteristics by using modified pseudo-noise (PN) codes in the encoding process to minimize the detrimental interference between CDMA channels which is called multiple access interference. In accordance with an aspect of the present invention, there is provided an optical Code Division Multiple Access (CDMA) transmitting apparatus for transmitting bipolar data, including: an optical CDMA encoding unit for encoding a light from the outside into a code and a complement code of the code to generate an encoded light into the code and an encoded light into the complement code; and an optical modulation unit for selecting and transmitting one of the encoded lights into the code and the complement code of the code based on the polarity ('0' or '1') of the data inputted from the outside.

In accordance with another aspect of the present invention, there is provided an optical CDMA transmitting apparatus for transmitting bipolar data, including: an optical modulation unit for outputting a light from the outside through a different output terminal based on the polarity ('0' or '1') of data inputted from the outside; and an optical CDMA encoding unit for receiving the light outputted from a first output terminal of the optical modulation unit, and encoding the light into a code; and receiving the light outputted from a second output terminal of the optical modulation unit, and encoding the light into a complement code of the code.

In accordance with another aspect of the present invention, there is provided an optical CDMA transmitting apparatus for transmitting bipolar data, including: a first light source, which is turned on based on data inputted from the outside, for outputting a light; a second light source, which is turned on in opposition to the first light source, for outputting a light; and an optical CDMA encoding unit for receiving the light outputted from the second light source, encoding the light into a code, and receiving the light outputted from the first light source, encoding the light into a complement code of the code, and then transmitting the encoded light into the code or the complement code.

In accordance with another aspect of the present invention, there is provided an optical CDMA transmitting method used in an optical CDMA transmitting apparatus for transmitting bipolar data, including the steps of: a) encoding a light into a code and a complement code of the code; and b) selectively transmitting the encoded light into the code or the complement code based on the polarity ('0' or '1') of data to be transmitted by using one optical modulator.

In accordance with another aspect of the present invention, there is provided an optical CDMA transmitting method used in an optical CDMA transmitting apparatus for transmitting bipolar data, including the steps of: a) outputting a light through a different output terminal based on the polarity ('0' or '1') of data to be transmitted; and b) encoding the light outputted through a first output terminal into a code between the lights outputted in the step a), and encoding the light outputted through a second output terminal into a complement code of the code between the lights outputted in the step a), and then transmitting the code or the complement code.

In accordance with another aspect of the present invention, there is provided an optical CDMA transmitting method used in an optical CDMA transmitting apparatus for transmitting bipolar data, including the steps of: a) outputting a first light by turning on a first light source based on data to be transmitted; b) outputting a second light by turning on a second light source in opposition to the step a) based on the data to be transmitted; and c) encoding the second light into a code, and encoding the first light into a complement code of the code, and then transmitting the code or the complement code.

Meanwhile, to achieve another object of the present invention, the optical CDMA transmitting apparatus and method of this invention performs encoding by using a filter having an arrangement of wavelengths for the lights to be reflected or to be transmitted based on a modified pseudo-noise code.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
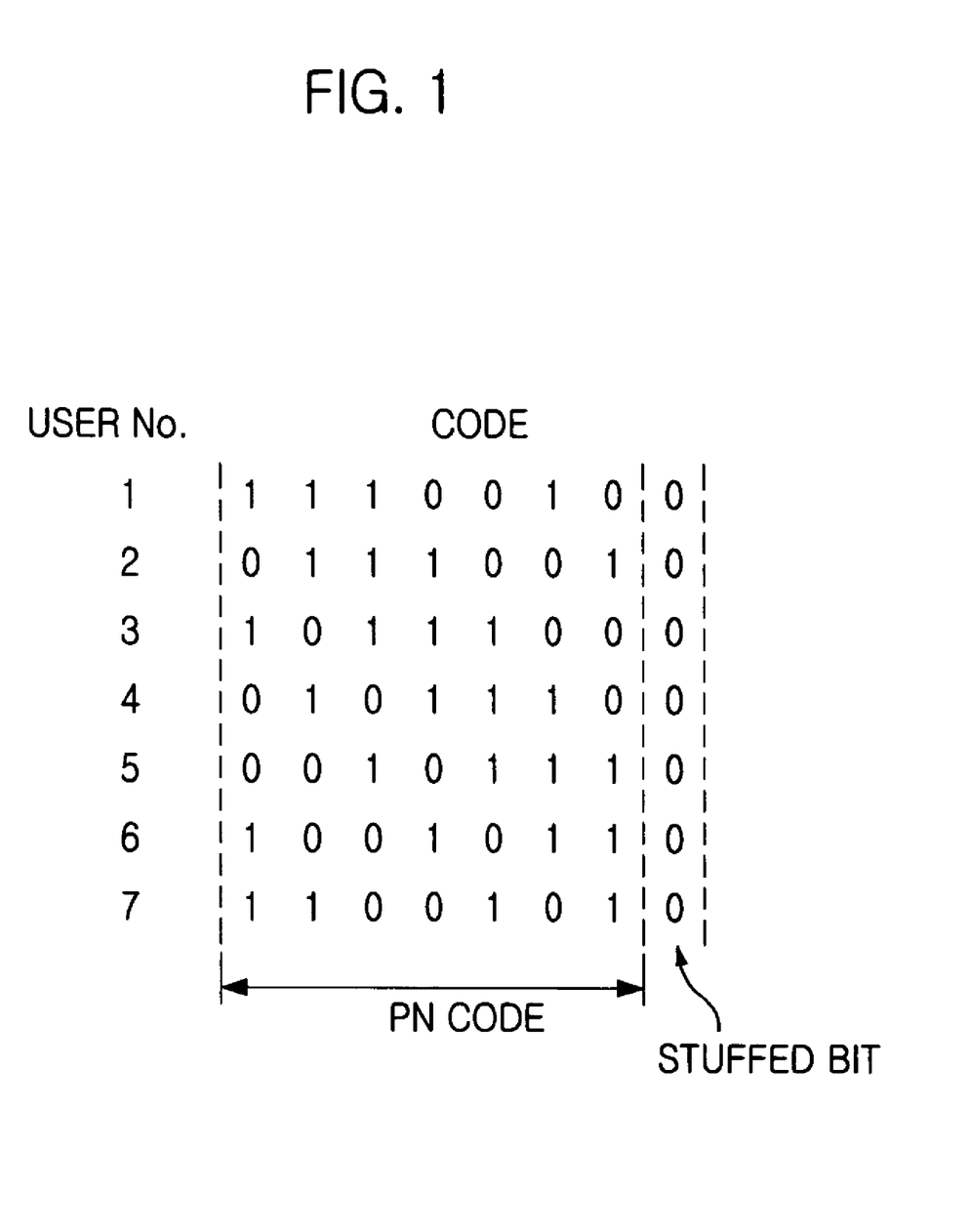
FIG. 1 is an exemplary diagram showing modified pseudo-noise (PN) codes in accordance with the present invention.

FIG. 1 is an exemplary diagram showing modified pseudo-noise (PN) codes in accordance with the present invention. In a conventional PN code, the number of '0' and the number of '1' are always different by one. Here, due to the difference between the number of '0' and the number of '1', interference occurs between the different Code Division Multiple Access (CDMA) channels in an optical CDMA system where bipolar data are transmitted and/or received using PN codes.

However, as illustrated in FIG. 1, the numbers of '0' and '1' can be the same by adding a stuffed bit '0' to an arbitrary position of a PN code. Then, the interference between the different CDMA channels disappears in an optical CDMA system using bipolar data. Here, it does not matter where to put the stuffed bit in the PN code, as long as it is placed in the same column that other stuffed bits are placed in all CDMA channel codes.

To make a decoder of the optical CDMA system receive the bipolar data transmitted thereto, the encoder of the optical CDMA system transmits the encoded light into a CDMA code Cn, such as PN code or Walsh code, if the data to be transmitted is '1', and if the data is '0', it transmits the encoded light into a complement code $\overline{Cn}$ of the CDMA code Cn.

Figure 2:
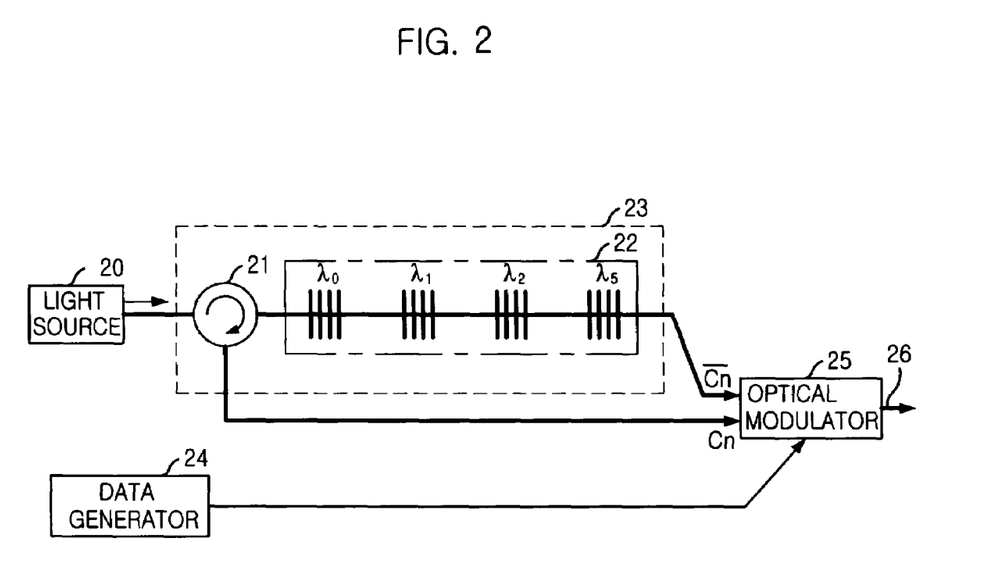
FIG. 2 is a block diagram illustrating an optical Code Division Multiple Access (CDMA) transmitting apparatus and method for transmitting bipolar data by using a 2×1 optical modulator in accordance with an embodiment of the present invention.
Figure 3:
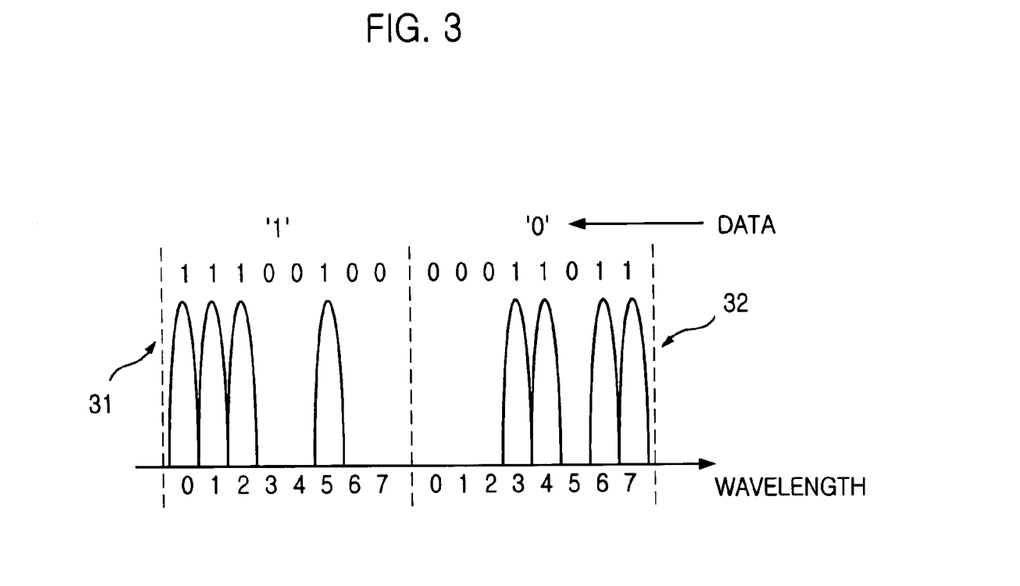
FIG. 3 is an exemplary diagram illustrating data encoded in an optical CDMA transmitting apparatus in accordance with the embodiment of the present invention.

Referring to FIG. 2 is a block diagram illustrating an optical CDMA transmitting apparatus and method for transmitting bipolar data by using a 2×1 optical modulator in accordance with an embodiment of the present invention, and FIG. 3 is an exemplary diagram illustrating data encoded in an optical CDMA transmitting apparatus in accordance with an embodiment of the present invention.

Referring to FIG. 2, the optical CDMA transmitting apparatus of the present invention includes: an optical CDMA encoder 23 for encoding a light from an external light source 20 into a code and a complement code of the code by assigning the center wavelengths of optical fiber Bragg grating (FBG) filters based on a code; and a 2×1 optical modulator 25 for selecting and transmitting the encoded light into a code in the optical CDMA encoder 23 or the complement code of the code to an optical CDMA receiving apparatus (see FIG. 7) based on the polarity ('0' or '1') of data inputted from a data generator 24, which is to be transmitted.

The optical CDMA encoder 23 includes an optical circulator 21 and optical fiber Bragg grating (FBG) filters 22. The optical circulator 21 transmits the light from the light source 20 to the optical FBG filters 22 and transmits the encoded light into a code Cn, which is encoded by reflecting the light in the optical FBG filters 22, to the 2×1 optical modulator 25.

The optical FBG filters 22 return to the optical circulator 21 the encoded light into the code Cn, which is obtained by reflecting the light, and the returned light is transmitted to the 2×1 optical modulator 25 through the optical circulator 21; and directly transmits to the 2×1 optical modulator 25 the encoded light into a complement code $\overline{Cn}$ of the code, which is obtained by transmitting the light inputted from the optical circulator 21.

As described above, the optical CDMA encoder 23 can be embodied using optical FBG filters 22 having reflection wavelengths of $\lambda_0$, $\lambda_1$, $\lambda_2$ and $\lambda_5$. When the optical FBG filters 22 are used, the light reflected from the optical FBG filters 22 have wavelengths of $\lambda_0$, $\lambda_1$, $\lambda_2$ and $\lambda_5$, and the light transmitted through the optical FBG filters 22 have wavelengths of $\lambda_3$, $\lambda_4$, $\lambda_6$ and $\lambda_7$. Here, as illustrated in FIGS. 2 and 3, the light reflected from the optical FBG filters 22 are encoded into a code Cn (11100100) 31, and the light transmitted through the optical FBG filters 22 are encoded into a complement code $\overline{Cn}$ (00011011) 32 of the code Cn 31.

To describe the operation of the optical CDMA encoder 23, the light from the light source 20 are transmitted through the optical FBG filters 22 and encoded into the complement code $\overline{Cn}$. Then, the complement code is transmitted from one output terminal of optical FBG filters 22 to one input terminal of the 2×1 optical modulator 25. Between the lights, the light reflected in the optical FBG filters 22 are encoded into a code Cn. The code Cn is transmitted from another output terminal of optical FBG filters 22 to another input terminal of the 2×1 optical modulator 25 through the optical circulator 21.

Subsequently, if the data inputted from the data generator 24 is '1', the 2×1 optical modulator 25 outputs the encoded light into the code Cn, and if the data is '0', it outputs the encoded light into the complement code $\overline{Cn}$ of the code Cn to the optical CDMA receiving apparatus (see FIG. 7), selectively. This way, the optical CDMA receiving apparatus can receive bipolar data.

Meanwhile, a system having no interference between different CDMA channels can be formed as follows. First, an optical CDMA encoder 23 is formed by assigning the wavelengths of the optical FBG filters 22 based on a modified PN code as shown in FIG. 1, and then an optical CDMA transmitting apparatus is formed adopting the optical CDMA encoder 23 and the 2×1 optical modulator 25, as illustrated in FIG. 2. If the optical CDMA transmitting apparatus is coupled with the optical CDMA receiving apparatus (see FIG. 7), which will be described later on, the system without multiple access interference is completed. An optical CDMA transmitting apparatus in accordance with another embodiment of the present invention can be used in the system in the same way.

Figure 4:
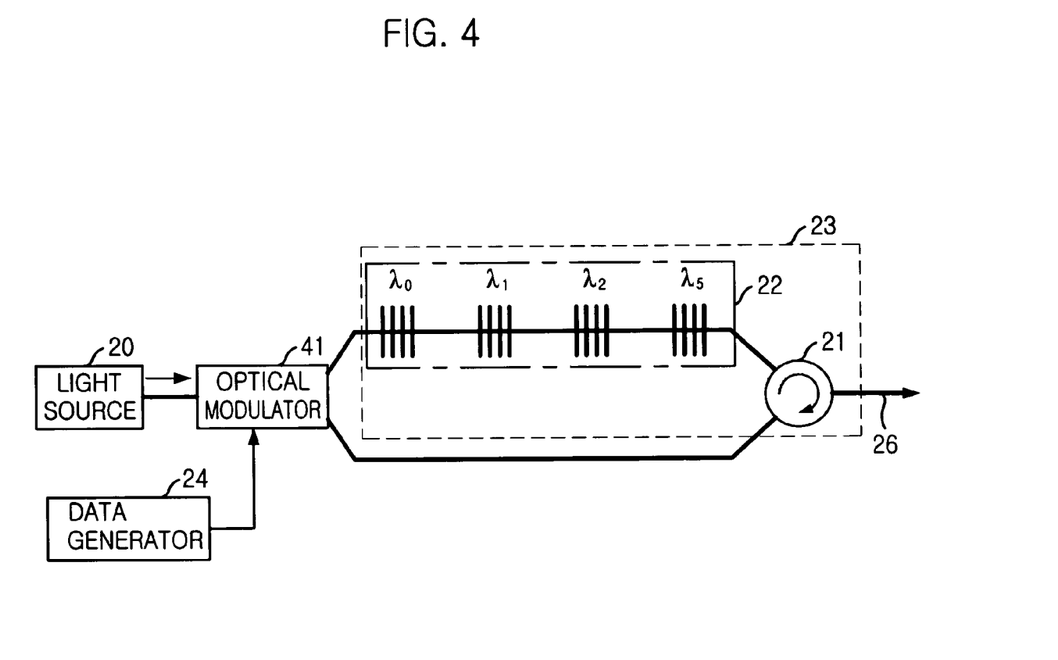
FIG. 4 is a block diagram illustrating an optical CDMA transmitting apparatus and method for transmitting bipolar data by using a 1×2 optical modulator in accordance with another embodiment of the present invention.

FIG. 4 is a block diagram illustrating the optical CDMA transmitting apparatus and method for transmitting bipolar data by using a 1×2 optical modulator in accordance with another embodiment of the present invention. As illustrated in FIG. 4, the optical CDMA transmitting apparatus of another embodiment of the present invention includes a 1×2 optical modulator 41 for receiving a light from a light source 20 and outputting them through different output terminals based on the polarity ('0' or '1') of the data that are inputted from a data generator 24; and an optical CDMA encoder 23 for receiving the light transmitted from one output terminal of the 1×2 optical modulator 41, encoding them into a code (which is a code encoded based on the wavelength assignment of the optical FBG filters), or receiving the light from another output terminal of the 1×2 optical modulator 41, encoding them into a complement code of the code, and then transmitting the code or the complement code to the optical CDMA receiving apparatus (see FIG. 7).

The optical CDMA encoder 23 includes the optical circulator 21 and the optical FBG filters 22. The optical circulator 21 receives the light outputted from one output terminal of the 1×2 optical modulator 41, inputs them to the optical FBG filters 22 in the reverse direction, and outputs the encoded light into a code Cn, which is obtained by encoding the light reflected in the optical FBG filters 22, through an output terminal of the optical circulator. The optical circulator 21 also outputs a complement code $\overline{Cn}$ of the code Cn, which is obtained by encoding the light transmitted from the optical modulator in the optical FBG filters 22.

The optical FBG filters 22 transmit to the optical circulator 21 the encoded light into a code Cn, which is obtained by reflecting the light inputted in the reverse direction from the optical circulator 21 and transmit to the optical circulator 21 the encoded light into the complement code $\overline{Cn}$, which is obtained by transmitting the light outputted from another output terminal of the 1×2 optical modulator 41.

As described in FIG. 2, the optical CDMA encoder 23 can be embodied using an optical FBG filters 22 having the wavelengths of $\lambda_0, \lambda_1, \lambda_2$ and $\lambda_5$.

Hereinafter, the operation of the optical CDMA transmitting apparatus will be described in accordance with another embodiment of the present invention. If the data inputted from the data generator 24 is '1', the 1×2 optical modulator 41 receives the light from the light source 20 and outputs them to the optical circulator 21 of the optical CDMA encoder 23 through one output terminal (i.e., the output terminal in the lower position of the 1×2 optical modulator 41 in FIG. 4). If the data inputted from the data generator 24 is '0', it outputs them to the optical FBG filters 22 of the optical CDMA encoder 23 through another output terminal (i.e., the output terminal in the upper position of the 1×2 optical modulator 41 in FIG. 4).

The light outputted from one output terminal when the input data is '1' are inputted to the optical FBG filters 22 through the optical circulator 21 of the optical CDMA encoder 23. The light reflected in the optical FBG filters 22 are encoded into a code Cn, and then the encoded light is outputted to the output terminal 26 again through the optical circulator 21. Meanwhile, the light outputted from another output terminal when the input data is '0' are transmitted to the optical FBG filters 22 of the optical CDMA encoder 23, and encoded into a complement code $\overline{Cn}$ of the code Cn, and then the encoded light to the complement code is outputted to the output terminal 26 through the optical circulator 21. Here, the signal outputted from the output terminal 26 are the same as those of FIG. 3, if the optical FBG filters 22 have the same wavelength assignment of FIG. 2.

Figure 5:
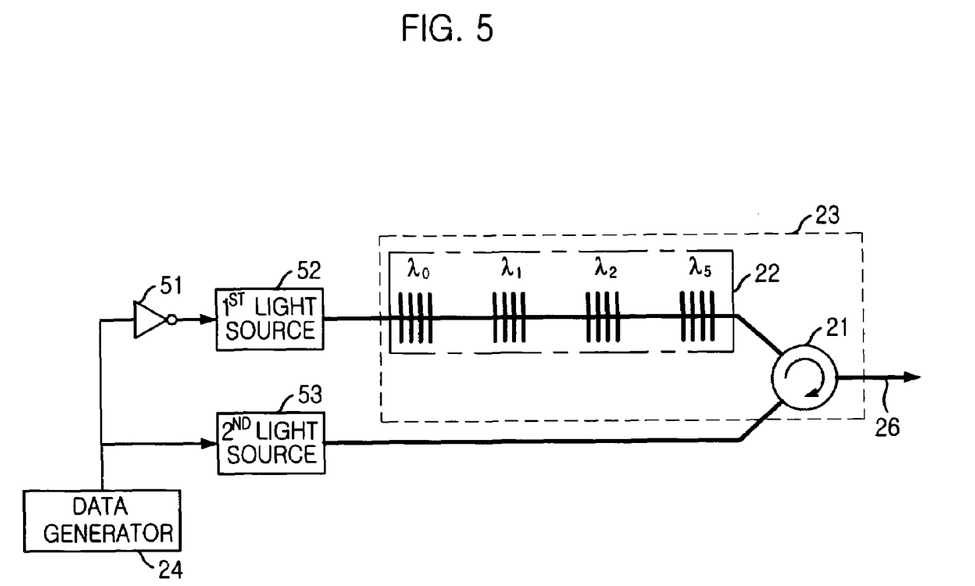
FIG. 5 is a block diagram showing an optical CDMA transmitting apparatus and method for transmitting bipolar data by using two light sources in accordance with another embodiment of the present invention.

FIG. 5 is a block diagram showing an optical CDMA transmitting apparatus and method for transmitting bipolar data by using two light sources in accordance with another embodiment of the present invention. As shown in the drawing, the optical CDMA transmitting apparatus of another embodiment includes a data generator 24, a first light source 52, a second light source 53, and an optical CDMA encoder 23. The first light source 52 is turned on based on the data inputted from a data generator 24 to output lights. The second light source 53 is turned on in opposition to the first light source 52 based on the data inputted from the data generator 24 to output lights. The optical CDMA encoder 23 receives the light outputted from the second light source 53, encoding the light into a code based on the wavelength assignment of the optical FBG filters 22, or receives the light from the first light source 52, encodes them into a complement code of the code, and then transmits the code or complement code to the optical CDMA receiving apparatus (see FIG. 7). Here, the first and second light sources 52 and 53 are turned on in opposition to each other by an inverter 51.

The optical CDMA encoder 23 includes an optical circulator 21 and optical FBG filters 22. The optical circulator 21 receives the light outputted from the second light source 53 and inputs them to the optical FBG filters 22 in the reverse direction to output the encoded light into a code Cn, which is obtained from the light reflected in the FBG filters 22, through the output terminal 26. It also outputs the encoded light into a complement code $\overline{Cn}$ of the code Cn, which is obtained from the light transmitted through the optical FBG filters 22, through the output terminal 26. The optical FBG filters 22 transmits to the optical circulator 21 the encoded light into the code Cn, which is obtained by reflecting the light inputted in the reverse direction from the optical circulator 21, and transmits to the optical circulator 21 the encoded light into the complement code $\overline{Cn}$ of the code Cn, which is obtained by transmitting the light outputted from the first light source 52.

As described in FIG. 2, the optical CDMA encoder 23 can be embodied using the optical FBG filters 22 having wavelengths of $\lambda_0, \lambda_1, \lambda_2$ and $\lambda_5$. Here, the data outputted from the output terminal 26 are the same as those of FIG. 3, if the optical FBG filters 22 used here have the same wavelength assignment of FIG. 2.

Figure 6:
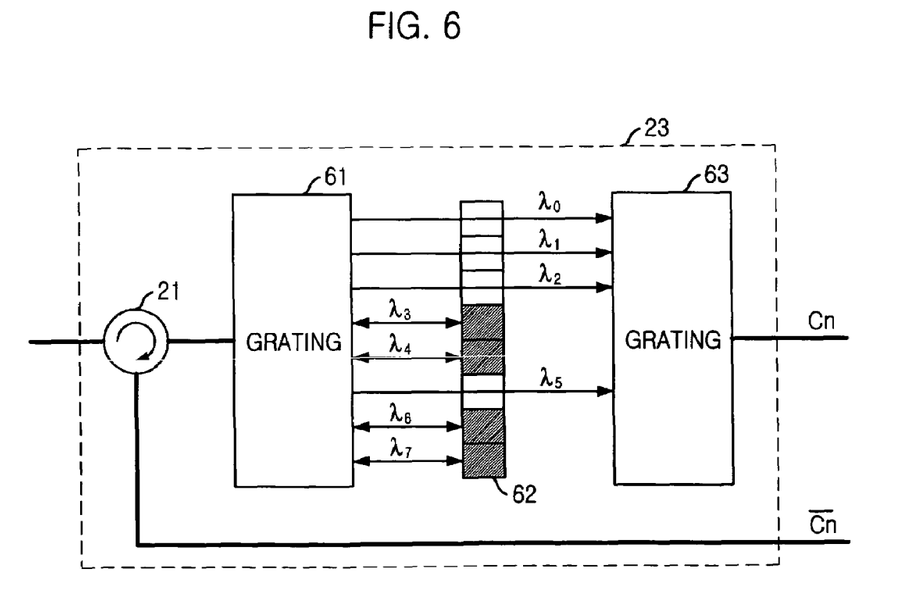
FIG. 6 is a block diagram describing an optical CDMA encoder in accordance with yet another embodiment of the present invention.

FIG. 6 is a block diagram describing an optical CDMA encoder in accordance with yet another embodiment of the present invention. It shows an example of an optical CDMA encoder formed by using a spatial filter 62 and diffraction gratings 61 and 63. As shown in the drawing, the optical CDMA encoder 23 includes an optical circulator 21, a first diffraction grating 61, a spatial filter 62 and a second diffraction grating 63. The optical circulator 21 transmits the light from an external light source to a first diffraction grating 61, and outputs the encoded light into a complement code of the code, which is obtained by reflecting the light in the spatial filter 62. The first diffraction grating 61 divides the lights inputted from the optical circulator 21 for different paths based on the wavelength and transmits the divided lights to a spatial filter 62, and combines the lights reflected in the spatial filter 62 to generate an encoded light into the complement code of the code, and then transmits to the optical circulator 21 the encoded light into the complement code of the code. The spatial filter 62 transmits to the first diffraction grating 61 the encoded light into the complement code of the code by reflecting the lights inputted from the first diffraction grating 61, and transmitting to a second diffraction grating 63 the encoded light into the code by transmitting the lights inputted from the first diffraction grating 61. The second diffraction grating 63 combines the lights which are obtained by transmitting the light through the spatial filter 62, to generate an encoded lights into the code, and outputs the encoded light.

The lights inputted through the optical circulator 21 are divided for different paths based on the wavelength in the first diffraction grating 61. Then, some of the lights having specific wavelengths are reflected, and the others pass through the spatial filter. Here, if the wavelengths for transmission and those for reflection are predetermined in the arrangement of the spatial filter 62 based on the modified pseudo-noise (PN) code in FIG. 1, the result is that the lights reflected from the spatial filter 62 have the wavelengths of $\lambda_3$, $\lambda_4$, $\lambda_6$ and $\lambda_7$, and the lights transmitted through the spatial filter 62 have the wavelengths of $\lambda_0$, $\lambda_1$, $\lambda_2$ and $\lambda_5$. And then the transmitted lights are encoded into the code and outputted as a code Cn (11100100), and the reflected lights are encoded into a complement code of the code and outputted as a complement code $\overline{Cn}$ (00011011) in the spatial filter 62.

Consequently, the optical CDMA encoder (i.e., reference numeral 23 of FIG. 6) using the spatial filter 62 and diffraction gratings 61 and 63 outputs the same result as the optical CDMA encoder adopting the optical FBG filters, described in FIGS. 2, 4 and 5. Therefore, when the optical CDMA encoder is applied to the optical CDMA transmitting apparatus of FIGS. 2, 4 and 5, the result comes out the same.

As shown from the above description, it is possible to use the optical FBG filters or the spatial filter, or other thin film filters, in forming the optical CDMA encoder.

Figure 7:
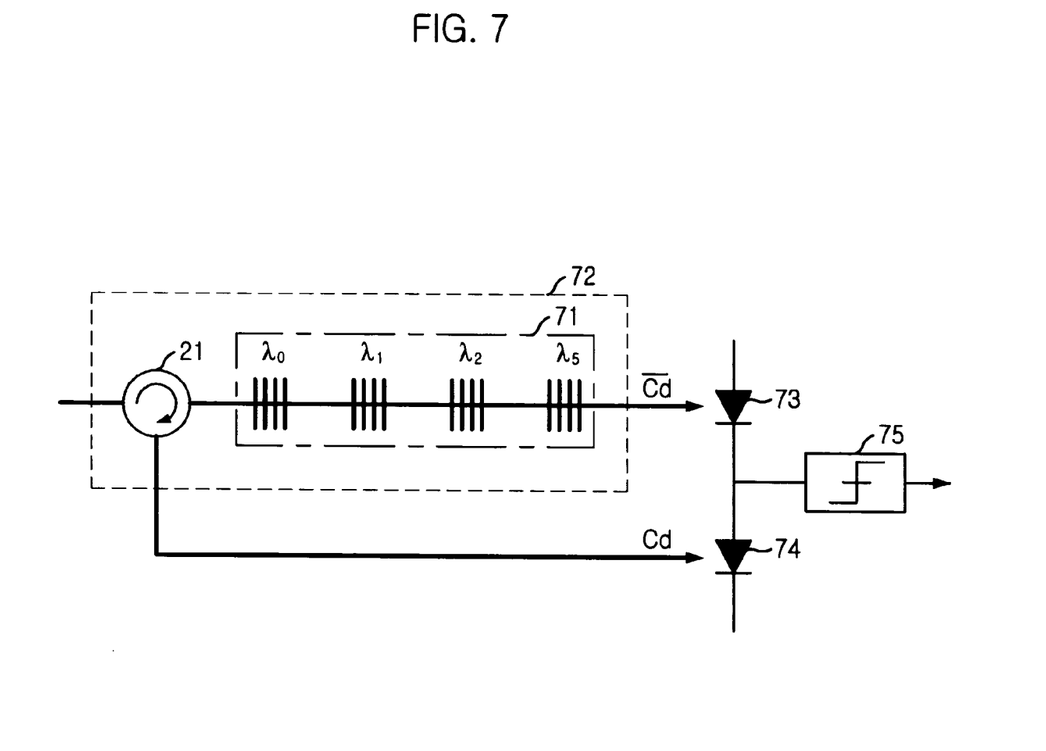
FIG. 7 is a block diagram depicting an optical CDMA receiving apparatus adopting a balanced detection method in accordance with an embodiment of the present invention, the receiving apparatus being capable of receiving bipolar data.

FIG. 7 is a block diagram depicting an optical CDMA receiving apparatus adopting a balanced detection method in accordance with an embodiment of the present invention, the receiving apparatus being capable of receiving bipolar data. The optical CDMA receiving apparatus adopting balanced detection method can receive the bipolar data transmitted from the optical CDMA transmitting apparatus.

As shown in FIG. 7, the optical signals transmitted through the optical FBG filters 71 of the optical CDMA decoder 72 among the received optical signals are decoded into a complement code $\overline{Cd}$, and the decoded light into the complement code $\overline{Cd}$ is inputted into a first optical detector 73. The optical signals reflected from the optical FBG filters 71 are decoded into a code Cd, and the decoded light into the code Cd is inputted into a second optical detector 74. Here, if the encoding code Cn and the decoding code Cd are the same and if the data transmitted from the optical CDMA transmitting apparatus is '1', all received optical signals are inputted to the second optical detector 74. If the data transmitted from the optical CDMA transmitting apparatus is '0', all received optical signals are inputted to the first optical detector 73. Therefore, bipolar data can be received by inputting the difference between the electric signals outputted from the first and second optical detectors 73 and 74.

Meanwhile, if the encoding code Cn and the decoding code Cd are not the same, the received and decoded optical signals are divided and inputted to the two optical detectors 73 and 74, regardless of the data transmitted from the optical CDMA transmitting apparatus. In case where a modified PN code is used, the intensities of the optical signals inputted to the two optical detectors 73 and 74 are the same. Therefore, the difference between the electric signals outputted from the first and second optical detectors 73 and 74 becomes zero, thus not affecting other CDMA channels.

The optical CDMA transmitting apparatus of the present invention, described above, can be formed using one optical CDMA encoder and one optical modulator. Also, in the present invention, it is possible to construct a system without multiple access interference by first forming the optical CDMA transmitting apparatus using a modified PN code and then forming an optical CDMA system using the optical CDMA transmitting apparatus. The technology of the present invention can improve the transmission rate by forming an optical CDMA encoder without using an electrical switch, which is different from conventional technologies.

While the present invention has been described with respect to certain preferred embodiments, it will be apparent to those skilled in the art that various changes and modifications may be made without departing from the scope of the invention as defined in the following claims.

What is claimed is:

1. An optical Code Division Multiple Access (CDMA) transmitting apparatus for transmitting bipolar data, comprising:
    an optical CDMA encoding means for encoding a light from outside into a code (Cn) and a complement code ($\overline{Cn}$) of the code to generate a first encoded light into the code and a second encoded light into the complement code;
    an optical modulation means for selecting and transmitting one of the encoded lights into the code and the complement code of the code based on the polarity ('0' or '1') of data inputted from the outside; and
    an optical circulator in the optical CDMA encoding means for transmitting the light to the optical modulation means through at least one filter to form the second encoded light, and for receiving the first encoded light from the at least one filter and then forwarding the first encoded light into the optical modulation means.

2. The optical CDMA transmitting apparatus as recited in claim 1, wherein the optical CDMA encoding means includes:
    the optical circulator for transmitting the light from an external light source to optical fiber Bragg grating (FBG) filters, and transmitting to the optical modulation means the first encoded light into the code (Cn), which is obtained by reflecting the light in the optical FBG filters; and
    the optical FBG filters for transmitting to the optical circulator the code, and transmitting to the optical modulation means the second encoded light into the complement code ($\overline{Cn}$) of the code, which is obtained by transmitting the light inputted from the optical circulator.

3. The optical CDMA transmitting apparatus as recited in claim 1, wherein the optical CDMA encoding means includes:
    the optical circulator for transmitting the light from an external light source to a first diffraction grating, and transmitting to the optical modulation means the second encoded light into the complement code of the code, which is obtained by reflecting in a spatial filter;
    the first diffraction grating for dividing the light inputted from the optical circulator for different paths based on the wavelength and transmitting the divided light to the spatial filter, and combining and transmitting to the optical circulator the second encoded light into the complement code which is obtained by reflecting the light in the spatial filter;
    the spatial filter for transmitting to the first diffraction grating the second encoded light into the complement code of the code, which is obtained by reflecting the light inputted from the first diffraction grating, and transmitting to a second diffraction grating the first encoded light into the code, which is obtained by transmitting the light inputted from the first diffraction grating; and the second diffraction grating for combining the first encoded light into the code from the light transmitted through the spatial filter, and transmitting the encode light into the code to the optical modulation means.

4. The optical CDMA transmitting apparatus as recited in claim 1, wherein the optical CDMA encoder performs encoding by using filters having an assignment of wavelengths for the light to be reflected or to be transmitted based on a modified pseudo-noise code.

5. An optical CDMA transmitting apparatus for transmitting bipolar data, comprising:

an optical modulation means for outputting a light from outside through a different output terminal based on the polarity ('0' or '1') of data inputted from the outside;

an optical CDMA encoding means for receiving the light outputted from a first output terminal of the optical modulation means, and encoding the light into a first encoded light with a code (Cn); and receiving the light outputted from a second output terminal of the optical modulation means, and encoding the light into a second encoded light with a complement code ($\overline{Cn}$) of the code; and an optical circulator in the optical CDMA encoding means for forwarding the light received from the first output terminal of the optical modulation means to filters and then receiving reflected light from the filters as the first encoded light, and for receiving the light transmitted from the optical modulation means through the filters as the second encoded light.

6. The optical CDMA transmitting apparatus as recited in claim 5, wherein the optical CDMA encoding means includes:

the optical circulator for receiving the light outputted from the first output terminal of the optical modulation means and inputting the light to optical FBG filters in a reverse direction, and then outputting through an output terminal the first encoded light into the code (Cn), which is obtained by reflecting the light in the optical FBG filters, and outputting through the output terminal the second encoded light into the complement code ($\overline{Cn}$), which is obtained by transmitting the light through the optical FBG filters; and the optical FBG filters for transmitting to the optical circulator the first encoded light into the code, which is obtained by reflecting the light inputted to the reverse direction from the optical circulator, and transmitting to the optical circulator the second encoded light into the complement code ($\overline{Cn}$) of the code, which is obtained by transmitting the light from the second output terminal of the optical modulation means.

7. The optical CDMA transmitting apparatus as recited in claim 5, wherein the optical CDMA encoder performs encoding by using the filters having an assignment of wavelengths for the light to be reflected or to be transmitted based on a modified pseudo-noise code.

8. An optical CDMA transmitting apparatus for transmitting bipolar data, comprising:

a first light source, which is turned on based on data inputted from outside, for outputting a light;

a second light source, which is turned on in opposition to the first light source, for outputting a light;

an optical CDMA encoding means for receiving the light outputted from the second light source, encoding the light into a code (Cn); or receiving the light outputted from the first light source, encoding the light into a complement code ($\overline{Cn}$) of the code, and then transmitting the code or the complement code; and an optical circulator in the optical CDMA encoding means for forwarding the light received from the second light source to filters and then receiving reflected light from the filters as the first encoded light, and for receiving the light transmitted from the first light source through the filters as the second encoded light.

9. The optical CDMA transmitting apparatus as recited in claim 8, wherein the optical CDMA encoding means includes:

the optical circulator for receiving the light outputted from the second light source and inputting the light to optical FBG filters in a reverse direction, and outputting through an output terminal the first encoded light into the code (Cn), which is obtained by reflecting the light in the FBG filters, and outputting through the output terminal the second encoded light into the complement code ($\overline{Cn}$), which is obtained by transmitting the light through the optical FBG filters; and the optical FBG filters for transmitting to the optical circulator the first encoded light into the code (Cn) by reflecting the light inputted in the reverse direction from the optical circulator, and transmitting to the optical circulator the second encoded light into the complement code ($\overline{Cn}$) of the code by transmitting the light outputted from the first light source.

10. The optical CDMA transmitting apparatus as recited in claim 8, wherein the optical CDMA encoder performs encoding by using the filters having an assignment of wavelengths for the light to be reflected or to be transmitted based on a modified pseudo-noise code.

11. An optical CDMA transmitting method used in an optical CDMA transmitting apparatus for transmitting bipolar data, comprising the steps of:

a) encoding a light into a first encoded light with a code or a second encoded light with a complement code of the code; and b) transmitting the first encoded light or the second encoded light based on the polarity ('0' or '1') of data to be transmitted by using one optical modulator, wherein the light is encoded into the second encoded light by transmitting the light through filters, and the light is encoded into the first encoded light by reflecting the light in the filters based on an optical circulator and a filter set.

12. The optical CDMA transmitting method as recited in claim 11, wherein the step of encoding the light into the code or the complement code is performed by using the filters having an assignment of wavelengths for the lights to be reflected or to be transmitted based on a modified pseudo-noise code.

13. An optical CDMA transmitting method used in an optical CDMA transmitting apparatus for transmitting bipolar data, comprising the steps of:

a) outputting a light through a different output terminal based on the polarity ('0' or '1') of data to be transmitted; and b) encoding the light outputted through a first output terminal into a first encoded light with a code between the lights outputted in the step a), and encoding the light outputted through a second output terminal into a second encoded light with a complement code of the code among the lights outputted in the step a), and then transmitting the first encoded light or the second encoded light, wherein the light is encoded into the second encoded light by transmitting the light through filters, and the light is encoded into the first encoded light by reflecting the light in the filters based on an optical circulator and a filter set.

14. The optical CDMA transmitting method as recited in claim 13, wherein the step of encoding the light into the code and the complement code is performed by using the filters having an assignment of wavelengths for the light to be reflected or to be transmitted based on a modified pseudo-noise code.

15. An optical CDMA transmitting method used in an optical CDMA transmitting apparatus for transmitting bipolar data, comprising the steps of:
   a) outputting a first light by turning on a first light source based on data to be transmitted;
   b) outputting a second light by turning on a second light source in opposition to the step a) based on the data to be transmitted; and
   c) encoding the second light into a first encoded light with a code, and encoding the first light into a second encoded light with a complement code of the code, and then transmitting the first encoded light or the second encoded light,
   wherein the light is encoded into the second encoded light by transmitting the light through filters, and the light is encoded into the first encoded light by reflecting the light in the filters based on an optical circulator and a filter set.

16. The optical CDMA transmitting method as recited in claim 15, wherein the step of encoding the light into the code or the complement code is performed by using the filters having an assignment of wavelengths for the lights to be reflected or to be transmitted based on a modified pseudo-noise code.

* * * * *